(12) United States Patent
Nicolin

(10) Patent No.: US 6,336,723 B1
(45) Date of Patent: Jan. 8, 2002

(54) METHOD OF MAKING A GLASS SUBSTRATE WITH INK-BASED PATTERNS

(75) Inventor: Heinz-Josef Nicolin, Bietigheim-Bissingen (DE)

(73) Assignee: Saint-Gobain Vitrage (FR)

( * ) Notice: Subject to any disclaimer, the term of this patent is extended or adjusted under 35 U.S.C. 154(b) by 0 days.

(21) Appl. No.: 09/214,141

(22) PCT Filed: Apr. 29, 1998

(86) PCT No.: PCT/FR98/00861

§ 371 Date: Sep. 30, 1999

§ 102(e) Date: Sep. 30, 1999

(87) PCT Pub. No.: WO98/49013

PCT Pub. Date: Nov. 5, 1998

(30) Foreign Application Priority Data

Apr. 30, 1997 (DE) .......................................... 197 18 303

(51) Int. Cl.⁷ .................................................. B41J 2/01
(52) U.S. Cl. ....................................... 347/105; 347/100
(58) Field of Search .............................. 347/105, 100; 106/426; 427/218

(56) References Cited

U.S. PATENT DOCUMENTS

| 4,043,824 | A | * | 8/1977 | Wagar | 106/236 |
|---|---|---|---|---|---|
| 4,262,040 | A | * | 4/1981 | Russo | 427/229 |
| 5,407,474 | A | * | 4/1995 | Airey et al. | 347/100 |
| 5,421,877 | A | * | 6/1995 | Hayakawa et al. | 106/453 |
| 5,948,471 | A | * | 9/1999 | Zimmer | 427/218 |

FOREIGN PATENT DOCUMENTS

| DE | 36 38 170 | 5/1988 |
|---|---|---|
| EP | 0 647 885 | 4/1995 |

\* cited by examiner

Primary Examiner—John Barlow
Assistant Examiner—M Shah
(74) Attorney, Agent, or Firm—Pennie & Edmonds LLP

(57) ABSTRACT

For the manufacture of a glass substrate bearing a multicolor decoration or image consisting of inks(s) for firing, a model of the multicolor decoration or image consisting of ink(s) of any type is manufactured on a support which is suitable for these inks. By means of a reproduction device composed of an image-capturing device, image-processing software and a printing means, the model is transferred onto the sheet of glass using one or more inks for firing. The layer of ink is then fired.

10 Claims, No Drawings

# METHOD OF MAKING A GLASS SUBSTRATE WITH INK-BASED PATTERNS

TECHNICAL FIELD

The present invention relates to a process for manufacturing a glass substrate coated with at least one layer of ink(s) (organic or inorganic ink(s)) forming one or more designs, for example one or more monochromic or polychromic coloured designs, this (these) design(s) being made of one or more inks suitable for coating glass, preferably of one or more light-fast inks for example made of an enamel or of several enamels.

BACKGROUND ART

In the prior art, the manufacture of sheets of glass bearing light-fast multicolour decorations or images is carried out by applying to the sheet of glass, by hand or by serigraphy, the desired multicolour images, consisting of ceramic or enamel inks for firing, followed by firing the images or decorations.

During the use of serigraphy, several serigraphy operations must be carried out one after the other depending on the number of colours (each colour requiring a serigraphy passage), it being understood that each printing operation must be followed by a drying operation before printing the next layer of ink. This printing is viable only when the same image or the same decoration must be applied to a large number of sheets of glass. For printing a small number of items with the same image or the same decoration, multicolour serigraphy is very expensive since a separate screen is required for each base colour. In addition, the cost of making an cleaning the serigraphy screen is very high.

For small runs, or when individual images, designs or decorations are concerned, enamels or ceramic inks can also be applied by hand to the sheet of glass. The application by hand of inks for firing onto the surface of the glass is, however, associated with specific requirements in terms of inks and dexterity of the person performing this operation, the inks applied remaining for a long time in a state in which they can easily be blurred during the process for applying the various colours one after the other, on account of the lack of absorption capacity of the surface of the glass and the specific properties of the inks for firing which are usually used.

SUMMARY OF THE INVENTION

The aim of the invention is to provide a process for manufacturing (a) glass substrate(s) bearing (a) design(s) based on ink(s), in particular on light-fast ink (s), this process being suitable for manufacturing, at low cost and without any risk of deterioration of the colours, small series of glass substrates bearing (a) coloured design(s), this process also making it possible to obtain varied designs with good graphic quality in a rapid and reproducible manner.

This aim is achieved by the process according to the invention, in which a model of the desired design(s), consisting of ink(s) or coloured material(s) of any type and being on one or more supports of any type, are taken, the desired design(s) on the model is (are) converted into digital or analog data (or a signal), the data (or signal) obtained is processed using image-processing software and the desired design(s) is (are) reproduced (or reconstituted), in the form of one or more layers of ink(s), on the glass substrate with the aid of a printing means connected to the computer carrying the image-processing software. In other words, the desired design s) is (are) reproduced on the glass substrate from a model by means of a reproduction device comprising a device for capturing (or taking) images, image-processing software and a printing means. The design(s) is (are) then generally fired at suitable temperatures (i.e., for example, at high temperature for inorganic inks such as enamels, in particular to temperatures of about 450 to about 750° C.).

The process according to the invention makes it possible to print any type of design on any type of glass surface without needing to change the reproduction device as a function of the design to be printed (unlike the serigraphy process in which each design requires a specific serigraphy screen). Moreover, in the case where one (or more) coloured design(s) is (are) produced and in which a colour printing means (such as a device with printing head(s) or decoration head(s) or a plotter) is used, it is possible to carry out the printing in a single passage, irrespective of the number of colours, thereby allowing a gain in production efficiency as well as suppression of the drying operations between the operations for applying the different colours. In addition, depending on the choice of model, the process in accordance with the invention makes it possible to distinguish and to determine the desired colours and shades on a model more quickly than on the glass substrate on which it is generally necessary to carry out a firing operation before obtaining the final colours. The process in accordance with the invention also makes it possible to reproduce already-existing images, decorations or designs directly, i.e. to transfer them directly onto the glass substrate, and the printed design (s) obtained has (have) very good graphic quality (it is possible in particular to reproduce photos in a satisfactory manner).

It may be noted, when an enamel-type light-fast ink for firing is used, that the printed design(s) has (have) excellent durability after firing, the fired enamels showing good attachment to the glass, good hardness and good colour-fastness.

DETAILED DESCRIPTION OF THE INVENTION

The glass substrate coated with the design(s) according to the process of the invention can be any type of vitreous of glass-based substrate, and in particular can be in the form of one or more sheets of glass. It can be, for example, glazing used in the building trade or in the motor vehicle industry. The substrate on which the design is deposited can be a plain glass substrate or possibly a substrate which already bears a design or a decorative or functional coating.

The ink(s) or coloured material(s) for the model can be ink(s) or coloured material(s) of any type, and similarly the support(s) for the model can be one (or more) support(s) of any type, although the ink(s) or coloured material(s) and the support(s) are preferably compatible. As regards the ink(s) used to coat the glass substrate, it can be ink(s) (organic or inorganic) of any type which is (are) suitable for coating glass (chosen, for example, from enamels or ceramic inks, light-sensitive resins, etc.) and preferably concerns light-fast ink(s) for firing (for example such as enamel or ceramic ink), the choice of ink(s) being within the capability of a person skilled in the art depending on the substrate used, the desired design and the intended application for the coated substrate.

Preferably, at least one ink for firing comprising one or more inorganic constituents (in particular inorganic pigments or dyes) and, in a particularly preferred manner, at least one enamel-type ink for firing is used. In the case of the use of at least one enamel, the enamel used generally comprises a powder formed of at least one glass sinter and, optionally, of one or more pigments, and comprises an organic and/or inorganic (usually organic) medium allowing setting to the desired viscosity for the application onto the substrate and allowing binding with the substrate.

The glass sinter can be any known glass sinter based on oxides chosen, for example, from silicon, lead, zinc, bismuth, titanium, zirconium, sodium, boron, lithium, potassium, calcium, aluminium, tin, vanadium, molybdenum, magnesium, etc. oxides.

The pigments can be chosen from compounds containing metal oxides such as chromium oxides, copper oxides, iron oxides, cobalt oxides and nickel oxides or can be chosen from copper chromates, cobalt chromates, etc.

The enamel can also comprise several sinters, one or more metals (iron, zinc, silver, etc.) or any other additive which can be used in enamels.

The medium present in the enamel must allow the setting to the desired viscosity for the application to the substrate (via the printing means) and can comprise solvents, diluents, oils such as pine oils and other plant oils, resins such as acrylic resins, petroleum fractions, film-forming materials, glycol-based products, it can be a hot-melt medium, etc.

The term model according to the invention is intended to refer both to a model in which the design(s) correspond(s) identically to the desired design(s), and a model in which the design(s) correspond(s) approximately to the desired design (s) without, however, necessarily being strictly identical, especially in terms of size. In particular, it is not necessary for the design(s) to be of actual size on the support, as is necessary during manufacture by serigraphy. By means of the use of suitable image-processing software, it is in particular possible to correct the model in the desired manner without any problem, for example to modify the scale or the sizes along different axes.

According to the invention, an already-existing model can be used. It is also possible to manufacture the model. Thus, according to one embodiment of the invention, the design(s) to be printed is (are) first made on one (or more) support(s) of any type, using ink(s) or coloured material(s) which is (are) suitable for this (these) support(s) (or is (are) made from ink(s) or coloured material(s) of any type on one (or more) support(s) which is (are) suitable for this (these) ink(s) or coloured material(s)) and is (are), if need be, corrected until it (they) reach(es) its (their) final form. In this case, one (or more) ink(s) or coloured material(s) and a single support which are easy to use and compatible, for example such as organic ink(s) for paint or crayon(s) and such as cardboard or paper, respectively, are preferably chosen.

The support(s) bearing the design(s) (i.e. the model) is (are) then scanned using a device for capturing (or taking) images, i.e. a device, such as a scanner or a CCD (charge coupled device) type sensor, which allows images to be converted into digital or analog data (or a signal). Known devices can be used (advantageously high-resolution devices) for example a colour scanner (in particular if the design(s) is (are) one (or more) coloured design(s)), the image data or control signals which serve to control the printing means then being produced by suitable image-processing software.

Devices such as devices with printing head(s) or with decoration head(s) or plotters are suitable as printing means for carrying out the process in accordance with the invention. In the case where an ink-jet printer is used in particular as printing means (it being optionally possible for this printer to have already been fitted with an image-capturing device such as a scanner), the droplets of ink(s) are ejected from one or more openings (or nozzles or nozzle pipes) located in one or more ink-jet printing heads piloted, for example, by one or more digital controls. It also is possible in particular to use as a printing means an air brush such as the system known under the name digital. Aerograph system, which is particularly suitable for horizontal layouts. Optionally, it may be desirable to adapt the nozzle pipes of the air brush or of the ink-jet printer to the viscosity of the ink(s) used (for example, the diameter of the nozzle pipes can be from about 50 to about 100 $\mu$m or can even be enlarged up to 200–300 $\mu$m, although an enlargement is penalizing in terms of image resolution and quality) and/or to take care to ensure, in particular by dilution using suitable diluents for the ink(s) used, that the flow properties (in particular the viscosity) of the said ink(s) are suited to the nozzle pipes of the air brush, or of the ink-jet printer.

According to one advantageous embodiment of the invention, one or more inks, preferably one or more enamels, with a maximum particle size of less than 50 $\mu$m (preferably less than 30 $\mu$m and in a particularly preferred manner, especially when an ink-jet printing plotter is used, less than 5 $\mu$m) and at least 90% by weight of the particles of which also preferably have a diameter of less than 25 $\mu$m (advantageously less than 15 $\mu$m, or even, in the case especially in which an ink-jet printing plotter is used, of less than 3 or 5 $\mu$m) are used to coat the glass substrate. The viscosity of the ink(s) is generally between 2 and 1000 cP (advantageously between 2 and 500 cP or even less than 100 or less than 25 cP) at the temperature of application to the substrate.

After each operation to deposit ink(s) or each passage (the desired design(s) generally being deposited in a single passage), it may be desirable to dry the layer(s) of ink(s) in order to permit sufficient hold and adhesion to the glass, thereby allowing handling of the coated substrate. When the design(s) is (are) sufficently dry, the coated substrate is heated, for example to temperatures from about 450 to about 750° C. (corresponding to the usual enamel firing temperatures), in order to fire the design (for example in order to melt and vitrify the enamel(s)). It is also possible to envisage a hardening operation (for example a heat-mediated hardening by sudden cooling) of the substrate in order to give it improved mechanical and thermal properties. Where appropriate, the firing can be carried out during the heat treatment associated with the spray-painting of the substrate.

The substrates obtained according to the invention have one or more layers of ink(s) forming one or more designs and having a surface which is free in particular or meshwork imprints (unlike the substrates obtained by serigraphy. The designs obtained are of good graphic quality.

The process in accordance with the invention will be described in greater detail below with the aid of an implementation example.

In the present example, a sheet of glass 6 mm in thickness and 200×100 cm in size has to be fitted with a multicolour decoration. The multicolour decoration must consist of light-fast translucent or transparent inks.

The multicolour decoration is first made on a cardboard or another paint support from standard inks and, if need be, corrected until it reaches its final form. The paint support bearing the finished decoration is then scanned using a high-resolution colour scanner of appropriate size. The image data or control signals serving to control a four-colour (black and the three primary colours: red, yellow and blue) Aerograph machine are produced by suitable image-processing software.

The horizontal Aerograph system from the Swiss company Baumgartner Trading AG, for example, has proved itself as a reproduction system. Using this Aerograph system, all the colours are applied in the course of one and the same printing operation, 256 gradations being possible for each colour. In this way, it is possible to make totally identical colour reproductions.

For firing on glass at about 500 to 700° C., the inks used in this example are inks for firing composed of inorganic dyes such as enamels. The commercially available inks are diluted using suitable diluents to an extent such that ink can be applied using the Aerograph nozzle pipes. Where appropriate, the Aerograph nozzle pipes are adapted to these inks, i.e. they must be fitted with slightly larger orifices.

By virtue of the reproduction device cited, the decoration is transferred onto the sheet of glass, the sheet of glass remaining in the horizontal position until the ink is more or less dry. Thereafter, the sheet of glass is heated in a horizontal oven at a temperature of about 650° C., during which the coloured decoration melts into an enamelled layer and is fired into the surface of the glass. The sheet of glass is then hardened by sudden cooling in air in a so-called hardening installation.

The process according to the invention can be used to manufacture glazing bearing (a) decorative or functibnal design(s), screens, etc.

What is claimed is:

1. A process for manufacturing glass substrates that include an ink-based design thereon, which comprises reproducing a desired design in the form of at least one layer of colored material directly on the surface of the glass substrate from a model of the desired design from a reproduction device comprising a device for capturing images, image-processing software, and an air brush.

2. The process of claim 1, wherein the model of the desired design is manufactured on a suitable support before being reproduced on the glass substrate using the reproduction device.

3. The process of claim 1, wherein the colored material comprises an enamel and is used to coat the glass substrate before the substrate is heated.

4. The process of claim 1, wherein the colored material comprises an ink.

5. The process of claim 4, wherein the ink contains at least 90% by weight of particles which have a diameter of less than 25 $\mu$m.

6. The process of claim 4, wherein the ink has a viscosity of between about 2 and 1000 cPs.

7. The process of claim 1, wherein the substrate is heated to a temperature of from about 450 to about 750° C. in order to fire the design thereon.

8. The process of claim 1, wherein the image printer is a four color air brush.

9. The process of claim 1, wherein a color scanner is used as the image-capturing device.

10. The process of claim 1, wherein the design is printed in a single pass across the substrate.

* * * * *

UNITED STATES PATENT AND TRADEMARK OFFICE
CERTIFICATE OF CORRECTION

PATENT NO. : 6,336,723 B1  Page 1 of 1
DATED : January 8, 2002
INVENTOR(S) : Heinz-Josef Nicolin It is certified that error appears in the above-identified patent and that said Letters Patent is hereby corrected as shown below:

Column 6,
Line 21, delete the ".".

Signed and Sealed this

Twenty-eighth Day of May, 2002

*Attest:*

*Attesting Officer*

JAMES E. ROGAN
*Director of the United States Patent and Trademark Office*